United States Patent
Laurila (10) Patent No.: US 12,379,466 B2
(45) Date of Patent: Aug. 5, 2025

(54) CLASSIFICATION OF MATTER FROM SPACE

(71) Applicant: ICEYE OY, Espoo (FI)

(72) Inventor: Pekka Laurila, Espoo (FI)

(73) Assignee: ICEYE OY, Espoo (FI)

( * ) Notice: Subject to any disclaimer, the term of this patent is extended or adjusted under 35 U.S.C. 154(b) by 125 days.

(21) Appl. No.: 18/266,475

(22) PCT Filed: Dec. 7, 2021

(86) PCT No.: PCT/EP2021/084669
§ 371 (c)(1),
(2) Date: Jun. 9, 2023

(87) PCT Pub. No.: WO2022/122770
PCT Pub. Date: Jun. 16, 2022

(65) Prior Publication Data
US 2024/0045025 A1   Feb. 8, 2024

(30) Foreign Application Priority Data
Dec. 10, 2020  (GB) ..................... 2019471

(51) Int. Cl.
*G01S 13/90* (2006.01)
*G01S 7/41* (2006.01)

(52) U.S. Cl.
CPC .......... *G01S 7/412* (2013.01); *G01S 13/9021* (2019.05); *G01S 13/904* (2019.05)

(58) Field of Classification Search
CPC .............. G01S 13/9021; G01S 13/904; G01S 13/9041; G01S 13/9054; G01S 7/412
See application file for complete search history.

(56) References Cited

U.S. PATENT DOCUMENTS 6,441,772 B1 * 8/2002 Hellsten .............. G01S 13/9017
  342/25 R
10,310,074 B1   6/2019 Ni
(Continued)

FOREIGN PATENT DOCUMENTS

CN   102621994        8/2012
CN   106228201 A     12/2016
(Continued)

OTHER PUBLICATIONS

CN 107064935 translation (Year: 2019).*
(Continued)

*Primary Examiner* — Timothy A Brainard
(74) *Attorney, Agent, or Firm* — Cozen O'Connor (57) ABSTRACT

Multiple synthetic aperture radar "SAR" images of a target area on the earth are acquired using a satellite travelling in an orbit above the earth in a single pass of the satellite over the target area. In some methods, the data for each image is acquired from a different angle of incidence with respect to the target area. Then, the variation of quantity of backscattered radiation with respect to angle of incidence is analysed and used to identify matter imaged in a pixel or pixel group. In other methods, the data for each image is acquired from a different angle of incidence with respect to the target area, and the different angles of incidence are determined based on the specular reflection curve for a particular material. Then the quantity of backscattered radiation is analysed to determine whether the particular material is present based on the quantity of backscattered radiation. 'Extended dwell spotlight acquisition' geometry may be used in which image data acquisition apparatus may be locked to illuminate same target as the satellite passes over the target for a period of for example 20 seconds.

10 Claims, 7 Drawing Sheets

(56) References Cited

U.S. PATENT DOCUMENTS

| | | | |
|---|---|---|---|
| 2006/0028371 A1 | 2/2006 | Hansen et al. | |
| 2012/0035884 A1 | 2/2012 | Ingram et al. | |
| 2014/0056528 A1 | 2/2014 | Tarhan et al. | |
| 2016/0306063 A1* | 10/2016 | Hyde | G01S 13/885 |
| 2017/0178399 A1 | 6/2017 | Fest | |
| 2018/0038694 A1 | 2/2018 | Bruemmer et al. | |
| 2018/0052224 A1* | 2/2018 | Bretschneider | G01S 7/414 |
| 2019/0025422 A1 | 1/2019 | Edinger et al. | |
| 2021/0036767 A1* | 2/2021 | Devaraj | H04B 7/18513 |
| 2021/0289135 A1* | 9/2021 | Rao | H04N 23/84 |

FOREIGN PATENT DOCUMENTS

| | | | | |
|---|---|---|---|---|
| CN | 106950566 | | 7/2017 | |
| CN | 107064935 A | * | 8/2017 | G01S 13/90 |
| CN | 105677942 B | | 12/2018 | |
| CN | 109116321 A | * | 1/2019 | G01S 13/9023 |
| CN | 110596704 A | * | 12/2019 | G01S 13/90 |
| EP | 2816371 | | 12/2014 | |
| ES | 2315584 | | 4/2009 | |
| JP | 2000235074 A | | 8/2000 | |
| JP | 2005-140607 A | | 6/2005 | |
| JP | 2009210332 A | | 9/2009 | |
| WO | 2011-154804 A1 | | 12/2011 | |
| WO | 2017099346 A1 | | 6/2017 | |
| WO | 2020/094872 | | 5/2020 | |

OTHER PUBLICATIONS

CN109116321 translation (Year: 2019).*
CN110596704 translation (Year: 2019).*
JoBea Cimino et al., Multiple Incidence Angle SIR-B Experiment Over Argentina: Mapping of Forest Units. Jul. 4, 1986, vol. GE-24, IEEE Transactions on Geoscience and Remote Sensing, 12 pages.
Li Wei-Hua et al., Multi-Angle Sar Images for Earthquake Damage Assessment. 2015, IEEE 5th Asia-Pacific Conference on Synthetic Aperture Radar, Beijing, China, 3 pages.
George A. Leshkevich and Son V. Ngheim, Satellite SAT Remote Sensing of Great Lakes Ice Cover, Part 2. Ice Classification and Mapping. Jun. 20, 2007, 15 pages.
PCT Written Opinion and Search Report issued in related PCT Patent Application No. PCT/EP2021/084669 mailed on Mar. 16, 2022.
PCT International Preliminary Report on Patentability issued in related PCT Patent Application No. PCT/ EP2021/084669 issued on Jun. 13, 2023.
Great Britain Office Action issued in related Great Britain Patent Application No. 2019471.8 mailed Jun. 1, 2021.
Great Britain Office Action issued in related Great Britain Patent Application No. 2019471.8 mailed Apr. 11, 2024.
Great Britain Office Action issued in related Great Britain Patent Application No. 2019471.8 mailed Jul. 11, 2024.
Great Britain Office Action issued in related Great Britain Patent Application No. 2019471.8 mailed Sep. 9, 2024.
Great Britain Intent to Grant issued in related Great Britain Patent Application No. 2019471.8 mailed Oct. 22, 2024.
Australian Office Action issued in connection with related Australian Patent Application No. 2021393910 dated Nov. 19, 2024.
Canadian Office Action issued in connection with related Canadian Patent Application No. 3,199,585 dated Oct. 1, 2024.
U.A.E. Office Action issued in connection with related U.A.E. Patent Application No. P600147/2023 dated Aug. 1, 2024.
Australian Office Action issued in related Australian Patent Application No. 2021393910 dated Jan. 29, 2025.
Japanese Office Action issued in connection with related Japanese Patent Application No. 2023-535373 mailed Jan. 6, 2025 with machine language translation.
Lorusso, Rino, et al., "Extension of Wavenumber Domain Focusing for spotlight COSMO-SkyMed SAR Data", European Journal of Remote Sensing, 48:1, pp. 40-70, Feb. 17, 2017.
Reigber, Andreas, et al., "First Demonstration of Airborne SAR Tomography Using Multibaseline L-Band Data", IEE Transactions on Geoscience and Remote Sensing (online), vol. 38, No. 5, pp. 2142-2152, Sep. 2000.
Anca Cristea, et al., "Integrating incidence Angle Dependencies Into the Clustering-Based Segmentation of SAR Images", IEEE Journal of Selected Topics in Applied Earth Observations and Remote Sensing, vol. 13, pp. 2925-2939, Jun. 16, 2020.
Internet Archive Search Dec. 2, 2024, URL: https://web.archive.org/web/20200824124129/https://sorabatake.jp/13534/, Sorabat, Ake, "Is it True that the smaller the antenna, the higher the resolution?, The mysteries of SAR are thoroughly explained without any formulas!", Aug. 24, 2020. (Machine translation provided).
Korean Office Action Patent Application No. 10-20213-7019561 mailing date, Mar. 11, 2025, 9 pages.

* cited by examiner

CLASSIFICATION OF MATTER FROM SPACE

The present invention relates to earth observation. The invention may be performed by communication satellites and any other kinds of spacecraft.

BACKGROUND

Communication satellites, orbiting around the earth, are increasingly used in a variety of applications, for example tracking positions of objects, surveying sites, and observing changing weather patterns.

Many modern satellites are equipped with synthetic-aperture radar (SAR). These radar types may be used to create 2D and 3D landscape views of areas on the surface of the earth.

Recently there has been interest in the use of satellites to detect water on the earth, for example in urban or other areas to detect flooding. However, this is an example of a problem where traditional methods of SAR detection/classification (such as polarization, thresholding, change detection, statistical analysis) fall short. This is due to the fact that large differences in reflectivity, complicated multi-path reflections, and no large open areas make statistical or texture analysis very difficult to achieve.

SUMMARY

In one aspect there is provided in the following a method of earth observation in which multiple synthetic aperture radar "SAR" images of a target area on the earth are acquired using a satellite travelling in an orbit above the earth.

In some methods, the data for each image is acquired from a different angle of incidence with respect to the target area. Then, for at least one pixel or pixel group in the images, the variation of quantity of backscattered radiation with respect to angle of incidence is analysed and used to identify matter imaged in the pixel or pixel group. Matter which may be identified includes properties of the earth's surface such as whether it is built up (as in towns and cities), cultivated or wild, specific materials such as water, crops, roads and forests, and other matter which will occur to a person skilled in this art.

In other methods, the data for each image is acquired from a different angle of incidence with respect to the target area, and the different angles of incidence are determined based on the specular reflection curve for particular matter, e.g. a particular material. Then, for at least one pixel or pixel group in the images, the quantity of backscattered radiation is analysed to determine whether the particular matter is present based on the quantity of backscattered radiation.

Whilst the above methods may be achieved in successive passes of a satellite, the orientation of image acquisition apparatus on the satellite with respect to the target area may be controlled to remain directed at the target area for a predetermined period as the satellite passes over the target area, whereby to acquire the multiple images in a single pass of the satellite over the target area.

Some embodiments of the invention may be implemented by suitably controlling satellites already in orbit and may therefore be achieved through the use of suitable algorithms implemented in processors on existing satellites. Therefore in some embodiments the invention provides instructions which when implemented on one or more processors on a satellite cause the implementation of any of the methods described here. The instructions may be provided in a computer readable medium such as signals in transit from the earth to the satellite.

It will be understood that this summary was provided to introduce a selection of concepts in a simplified form that will be further described below in the "Detailed Description" section.

This summary is not intended to identify key features or essential features of the claimed subject matter, nor is it intended to be used to determine the scope of the claimed subject matter.

BRIEF DESCRIPTION OF THE DRAWINGS

Some embodiments of the invention will be described, by way of example, with reference to the following drawings, in which.

DETAILED DESCRIPTION

The invention will be understood from the following detailed description of embodiments, which are meant to be descriptive, by way of example only, and not limiting. For the sake of brevity, some well-known features, methods, systems, procedures, components and circuits, that will be well known to those skilled in the art, are not described in detail.

Some embodiments of this invention provide methods of earth observation to identify or classify matter, e.g. materials, using information obtained from a satellite. The term "materials" is used here in its broadest sense to denote anything covering the surface of the earth including but not limited to water, forest, grassland, cultivated crops, building materials and others.

Figure 1:
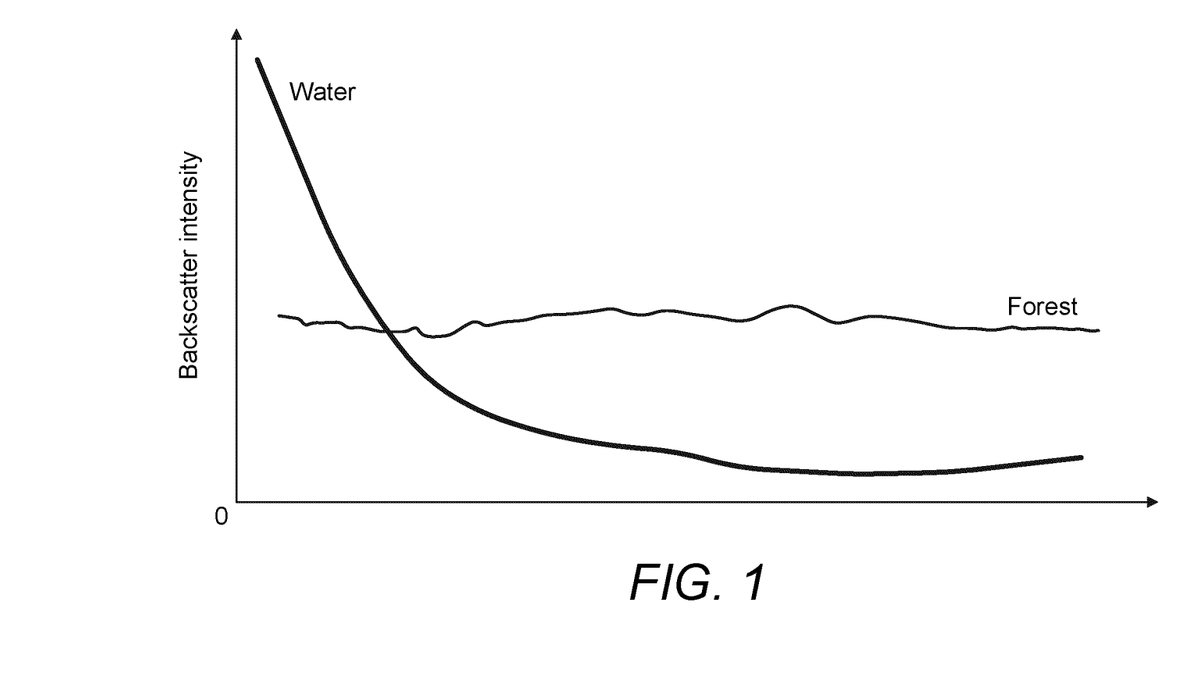
FIG. 1 is a sketched graph showing the difference in variation of backscatter intensity with angle of incidence of water and forest, in accordance with some embodiments of the present invention.

The return of radiation such as radar from a surface may be a combination of regular or "specular" reflection and backscattering or diffuse reflection. It is known that some materials have different "specular reflection curves" from others, which indicate the dependency of radiation/backscatter brightness on incidence angle of radiation. The same applies to other kinds of matter. For example water has a very different specific specular reflection curve from a forest. At low incidence angles the surface of water returns majority of the energy like a mirror surface, in other words the majority of the reflection is specular. At larger incidence angles the surface reflects the energy forward, so backscatter measurement shows very low values. In contrast, for instance forest or grasslands return more diffuse scatter, where the dependency of backscatter energy on incidence angle is much smaller. FIG. 1 is a sketched graph of backscatter intensity vs angle of incidence water and forest, illustrating the contrast between the two different materials. Differences in specular reflection may be used to identify a wide variety of matter including but not limited to those mentioned above. For example agriculture fields in different growth stages will have a specific 'specular curve'. If a precise identification is not possible, methods according to some embodiments may be used to classify matter, e.g. to determine its general type. Therefore in all embodiments to be described, "classification" of materials or matter may be substituted for "identification".

Other bright reflector targets, such as buildings, can have a strong dependency on incidence angle, but most of the time the bright scatters are various corners, where the cut-off angles of the bright reflection are very different from that of water. Furthermore building walls are vertical, so they have a very different dependency.

According to some embodiments of the present invention, matter may be identified using information obtained from a satellite in orbit around the earth, using SAR image data. For example, a satellite may be used to acquire multiple images of a target area on the earth, with the data for each image being acquired from a different angle of incidence, or angular position, with respect to the target area. Then, the image data may be analysed, for example on a pixel by pixel or pixel group basis, for variation of quantity of backscattered radiation with respect to angular position. The analysis may be used to identify matter imaged in the pixel or pixel group.

The possibilities for the acquisition of image data from different angular positions with respect to a target are limited for a satellite where the "flight path" is predetermined, e.g. a fixed orbit above the earth. A number of possibilities are discussed with respect to specific embodiments of the invention, discussed in more detail below.

Using a suitable range of different angles of incidence, multiple different kinds of matter may be identified in the target area. Methods according to some embodiments may also be used to identify a single material in a target area, by using angles of incidence based on the known backscatter properties of a particular material. So, different angles of incidence for the acquisition of image data may be determined based on the known properties of a particular material and it may be determined whether or not the particular material is present on the earth based on the quantity of backscattered radiation, for example relative to other parts of the target area. Water is an example of a material particularly suited to this kind of process. A similar process may be used for example to differentiate areas of buildings from other coverage of the earth's surface.

It should be noted that it is not necessary for the implementation of embodiments of the invention for visible images to be provided. Thus the term "image" as used here can be taken to mean a pixel by pixel intensity readout, unless otherwise stated.

Image Acquisition

Figure 2:
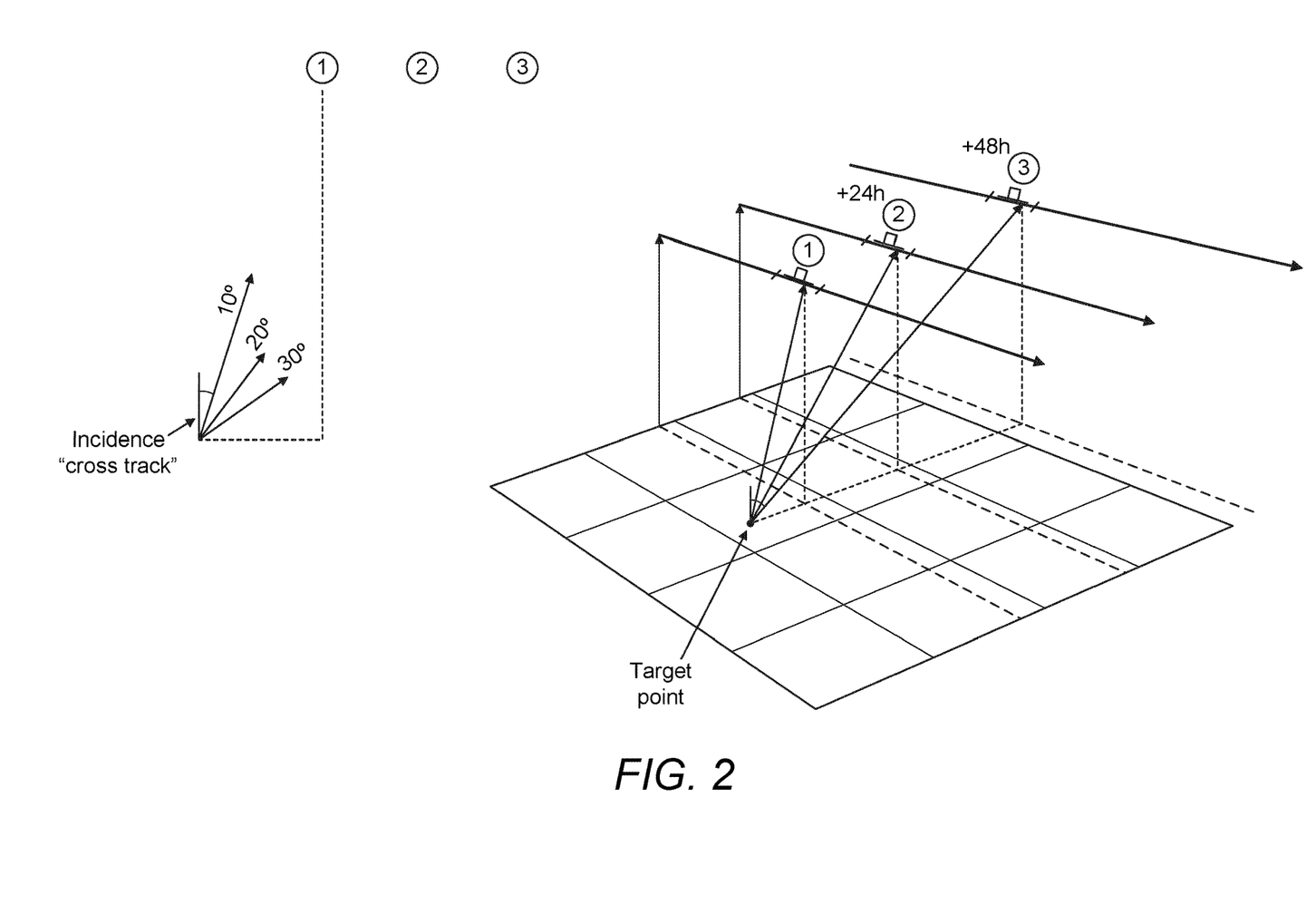
FIG. 2 is a schematic diagram illustrating methods performed by acquiring the image data in successive passes of the satellite over the target area, according to some embodiments of the invention.
Figure 6:
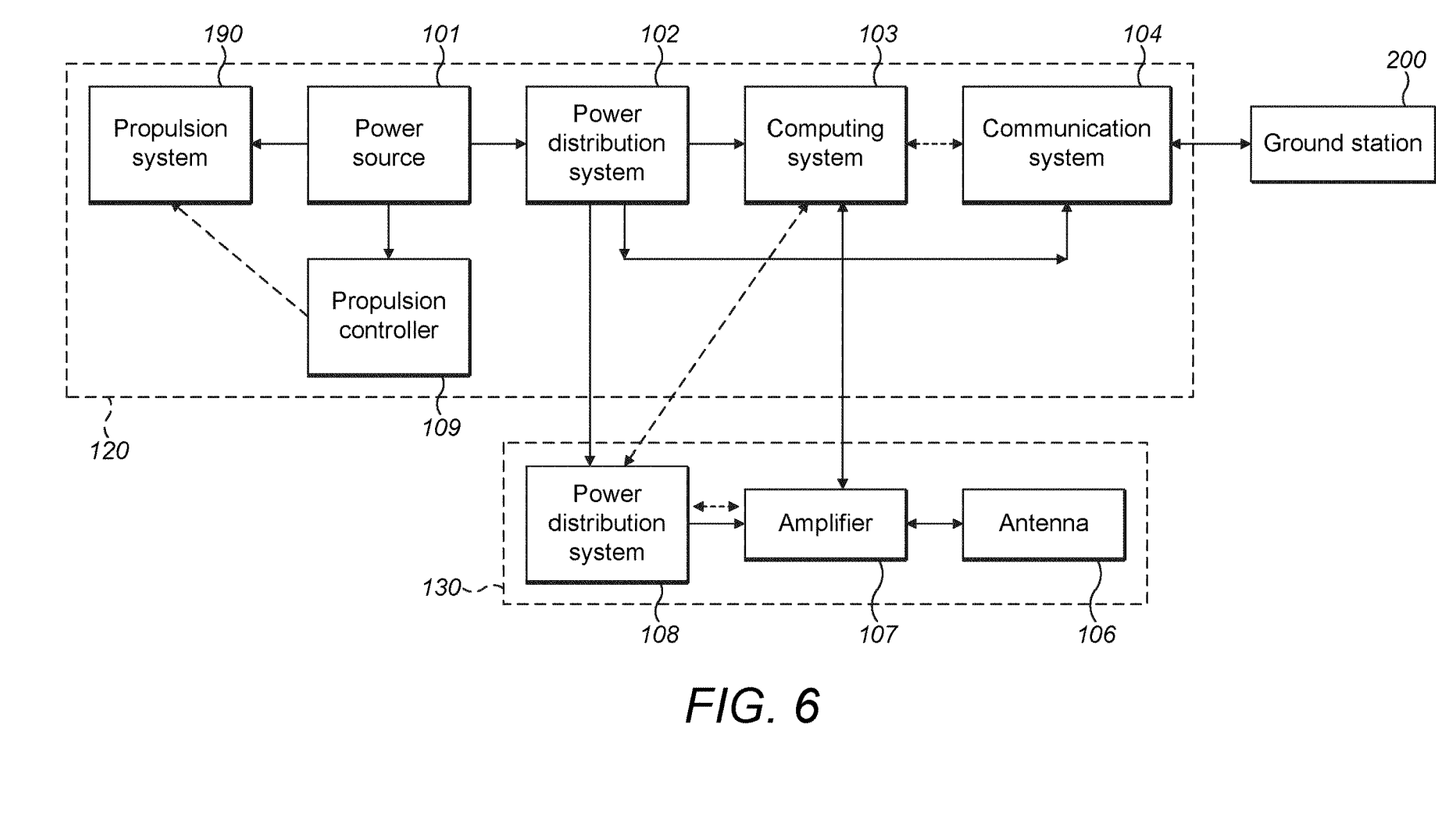
FIG. 6 is a schematic component diagram of a satellite 140 communicating with a ground station according to some embodiments of the invention.
Figure 7:
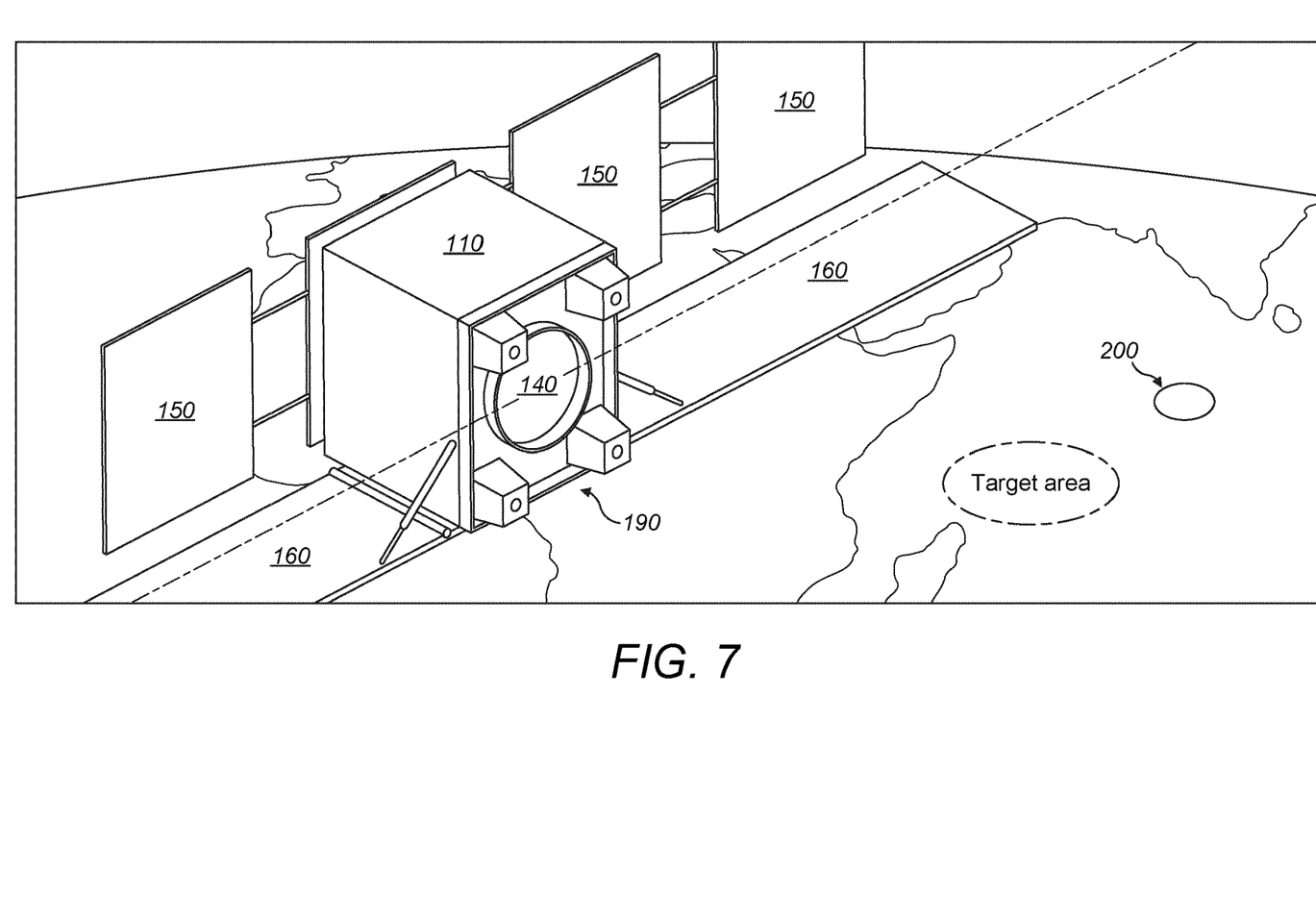
FIG. 7 is a perspective view of a satellite according to some embodiments of the invention, in orbit above the earth.

A satellite is typically equipped with image acquisition apparatus as is known in the art and described further with reference to FIGS. 6 and 7. In principle, methods according to some embodiments of the invention may be performed by acquiring the image data in successive passes of the satellite over the target area, possibly without the need to reorient the image acquisition apparatus with respect to the target, by acquiring the image data at different positions in successive passes, for example in known "cross track" mode. This is illustrated schematically in FIG. 2. Here it can be seen that the satellite is "side looking". In other words image data is not collected from the region immediately below the satellite. Without reorienting the image acquisition apparatus between passes, a target T may be imaged in pass 1 at time t1 from position 1 at an angle of 10°, in pass 2 at time t2 at an angle of 15° and from position 3 in pass 3 at time t3 at an angle of 30°. The different angles are mentioned by way of example and other angles and numbers of passes may be used.

Experiments with successive images obtained in this way have demonstrated that it is possible to reliably identify water in relatively complicated environments because of the known dependency of backscatter on incidence angle of incidence. Further, it has been demonstrated that this may be achieved within the limited range of incidence angles achievable with a side-looking satellite, typically of a magnitude, positive or negative, greater than 10° and often with an upper limit of 30°. However, where it is critical to have the matter identification more quickly, according to some embodiments of the invention, the image data may be obtained in a single pass of the satellite.

It is known to operate a SAR radar in a "spotlight" mode from a satellite, for example to obtain a higher resolution image of a particular target. In this mode, any variation of angle of incidence of the image acquisition apparatus, or radar source, with respect to the target is negligible. According to some embodiments of the invention, the orientation of the image acquisition apparatus with respect to the target may be controlled to remain directed at the target area for a predetermined period as the satellite passes over the target area, so as to acquire the image data from multiple different angles in a single pass of the satellite over the target area. This may be termed 'extended dwell spotlight acquisition' geometry which is different from the known "cross track" geometry. In an example of extended dwell, the image data acquisition apparatus may be locked to illuminate same target as the satellite passes over the target for a period of for example 20 seconds. It should be noted however that embodiments of the invention are not limited to pure spotlight modes of operation and other modes that enable the acquisition of the data from multiple different angles are possible, some of which will be mentioned below.

Since the image acquisition apparatus is "looking at" the same target for a longer period of time than would normally be the case, the frequency of acquisition of image data may be reduced. Methods according to some embodiments of the invention may sacrifice image quality in the process of identifying matter on the earth, for example to save on processing time and associated power.

Figure 3:
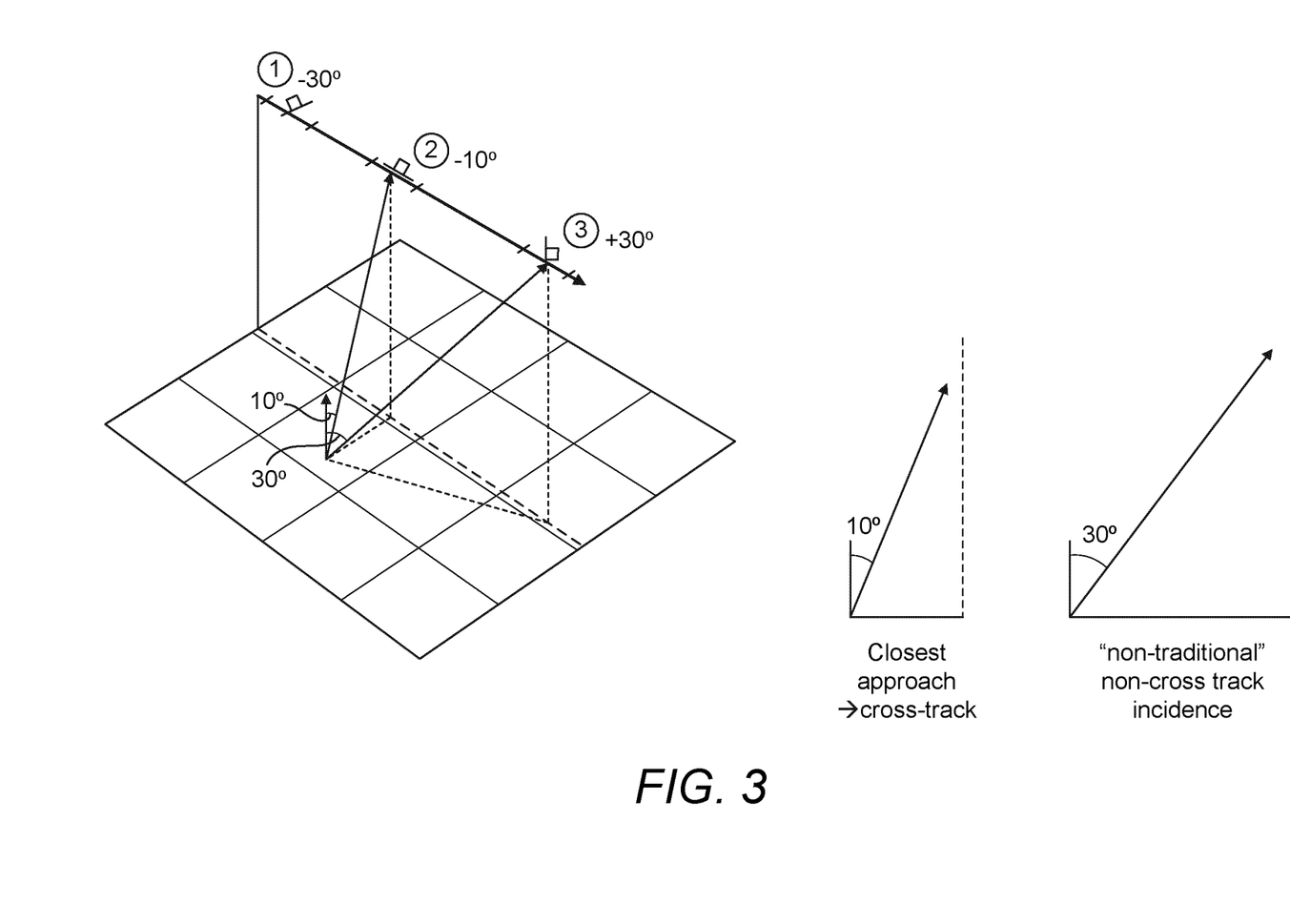
FIG. 3 is a schematic diagram illustrating methods performed by acquiring the image data in a single pass of the satellite over the target area, according to some embodiments of the invention.

FIG. 3 is a schematic diagram illustrating methods performed by acquiring the image data in a single pass of the satellite over the target area, according to some embodiments of the invention. Here, the target may be imaged at position 1 at an angle of 10°, similar to the closest "cross track" position in FIG. 2. In addition, by orienting the image acquisition apparatus with respect to the target, an image may be acquired at position 2 at an angle of 30° in the same pass of the satellite. Similarly an image may be acquired at −30° any number of angles in between. In other words there may be several acquisitions of data, equivalent to several images, in one pass of the satellite.

It can be seen that this method can be used to acquire image data to identify or classify matter in real time, in effect instantaneously, instead of over multiple passes, which may be critical for example in flood detection since the situation, e.g. spread of water, may change dramatically between one pass of the satellite and the next. The method shown in FIG. 3 is one that enables the creation of a meaningful variety of incidence angles in a single pass of the satellite.

As noted above, in a practical situation using a satellite to be described further below, the same target may be illuminated for over 20 seconds (compared with typically 2-3 seconds for a known "spotlight" image) as the satellite passes over the target.

The instantaneous incidence angle may be generated mostly forward but optionally backward along the flight track or both forward and backward (as opposed to the traditional definition of cross-track incidence angle, but still completely valid incidence angle from reflectivity point of view). An additional benefit of low incidence angles, for example 10-20 degrees and/or using both forward and backward incidence angles for urban flood detection is that it enables the generation of a view between buildings more effectively than traditional high incidence angle SAR acquisitions which are typically 35-50 degrees.

It can be seen in FIG. 3 that the distance between the satellite and the target area varies between positions 1, 2 and 3, with position 2 being the closest, and the closest possible being with a zero angle of incidence (directly overhead). With large angles of incidence the received reflected or backscattered power may be reduced due to the large distance between the satellite and the target, which may limit the range of possible angles of incidence or require the reflected power to be adjusted to compensate for this.

With either the multi-pass or the single pass approach, the imaging data obtained from the satellite may be used to analyse the variation of quantity of backscattered radiation with respect to angular position, in order to identify matter imaged in any pixel or pixel group. The analysis of the imaging data obtained from the satellite may take place on-board the satellite or at one or more ground stations.

Thus according to some embodiments of the invention, multiple images of the target are acquired using different incidence angles. Then, matter viewed in the images such as water, in urban and other relatively complicated areas or environments, may be classified based on the known dependency of backscatter or reflection on incidence angle.

As noted above, in order to identify matter in an image, lower resolution image data may be sufficient as compared to that required for other earth observation tasks. Therefore the frequency of data acquisition may be reduced thereby saving on power and processing requirements.

According to some embodiments of the invention using a single pass to acquire the image data, the image data may be acquired at specific or discrete intervals, thereby deliberately leaving gaps between periods of acquisition while still pointing to same target. For example, when a satellite flies over a target such as a city, the spotlight may start pointing to the target 50 seconds before and after the closest approach (directly overhead, 100 seconds in total) and take a 5 second acquisition every seconds resulting in a total of 5×5 second "looks" each with a large variety of incidence angles but without the need to use full 100 s worth of imaging energy. The orientation of the image acquisition apparatus with respect to the target area may be controlled with respect to the target during each interval so that images are acquired over a continuous range of angles although the image acquisition process is interrupted. In other words, for continuous or regular image data acquisition, the orientation of the image acquisition apparatus may be controlled as the satellite passes over the target to compensate for the motion of the satellite along its orbit and to keep the image acquisition apparatus directed at the target. To allow spaced image acquisition intervals, the orientation may be further controlled to enable the acquisition of images over a continuous range of angles whilst interrupting the acquisition of image data.

Some embodiments of the invention may be implemented using a small agile satellite, such as those operated by ICEYE OY. With such a satellite, controlling the orientation of the image acquisition apparatus with respect to the target is achieved by controlling the orientation of the satellite with respect to the target area. In other words, the orientation of image acquisition apparatus with respect to the target area may be changed by moving the whole satellite. It is not then necessary to change the orientation of the image acquisition apparatus with respect to the satellite body. Alternatively, for example where the satellite is larger, the control of the orientation of the image acquisition apparatus may involve reorienting the acquisition apparatus with respect to the satellite body, for example through the use of one or more motors on the satellite.

Image Data Analysis

The following is an example of how image data may be acquired, analysed and displayed according to some embodiments of the invention.

The task in this example was to generate an image of a city in order to enable the identification of water, particularly water between buildings which may be the result of flooding, in a single pass of the satellite. The process began by setting the image acquisition mode to "spotlight" as is known in the art, i.e. pointing to a target area continuously. The duration was set to 40 seconds in this example. In general this will depend on various factors including but not limited to one or more of the range of angles of interest and the speed of travel of the satellite.

A lowest incidence to the target was determined, in this instance 10°, which results in high backscatter from water. It should be noted here that a satellite will rarely fly directly over the target point. The minimum incidence angle is determined by the closest approach incidence angle. Only in special cases, where the satellite passes directly above target point, is the minimum incidence angle zero (however, SAR imaging requires side-looking geometry, i.e. 0° angle imaging does not result in an image). According to some embodiments of the invention the different angles of incidence from which image data is to be acquired may be predetermined based on the known properties, e.g. dependence on angle of incidence or specular reflection curves, matter, e.g. of any materials to be identified.

The "edges" in this example, i.e. most remote positions at which useful data could be obtained, were determined to be +/−20 s of flight time from the center or directly overhead position, where the incidence angle is approximately 20° (low backscatter from water). So the range of angles of incidence was determined to be 10°-20°.

Multiple high-resolution "looks" at the target area were then processed where the incidence angles ranged over the maximum (edges) 20° and minimum (centre) 10°.

Each "look" or image corresponds to a different angle of incidence. Therefore it is possible to analyse the reflected radiation power for dependency on angle of incidence and use this to identify matter on a pixel by pixel, or pixel group by pixel group, basis. This analysis may be used to identify matter in the images.

The analysis may be performed by a computing system on board the satellite. Alternatively the image data may be transmitted to a ground station in any manner known in the art for analysis. The display of the data may be at one or more ground stations.

According to some embodiments of the invention, look up tables or other reference data may be used and correlated with image data obtained by a process as described in this example in order to identify matter on the earth from the image data. It will be appreciated that such processes may be augmented using machine learning to improve the reliability of identifying matter.

According to other embodiments of the invention, a multi-channel raster may be generated from the "looks", e.g. the respective image data for each angle of incidence, and from this matter may be classified according to the response, and optionally presented in an image on a display. In some embodiments, a subset of the different angles of incidence may be allocated to each of primary colours for a visual display and the summed intensity values used to generate a colour representation of the target area. In order to generate an image, red, green and blue (RGB) channels may be designated where R=sum of looks where incidence angle >15°, G sum of looks where incidence 15°-10° and G looks where incidence=10°. Water should look 'blue' in this image (bright in B channel and dark in others), and diffuse targets should look 'white' (equally bright in all channels).

Figure 4:
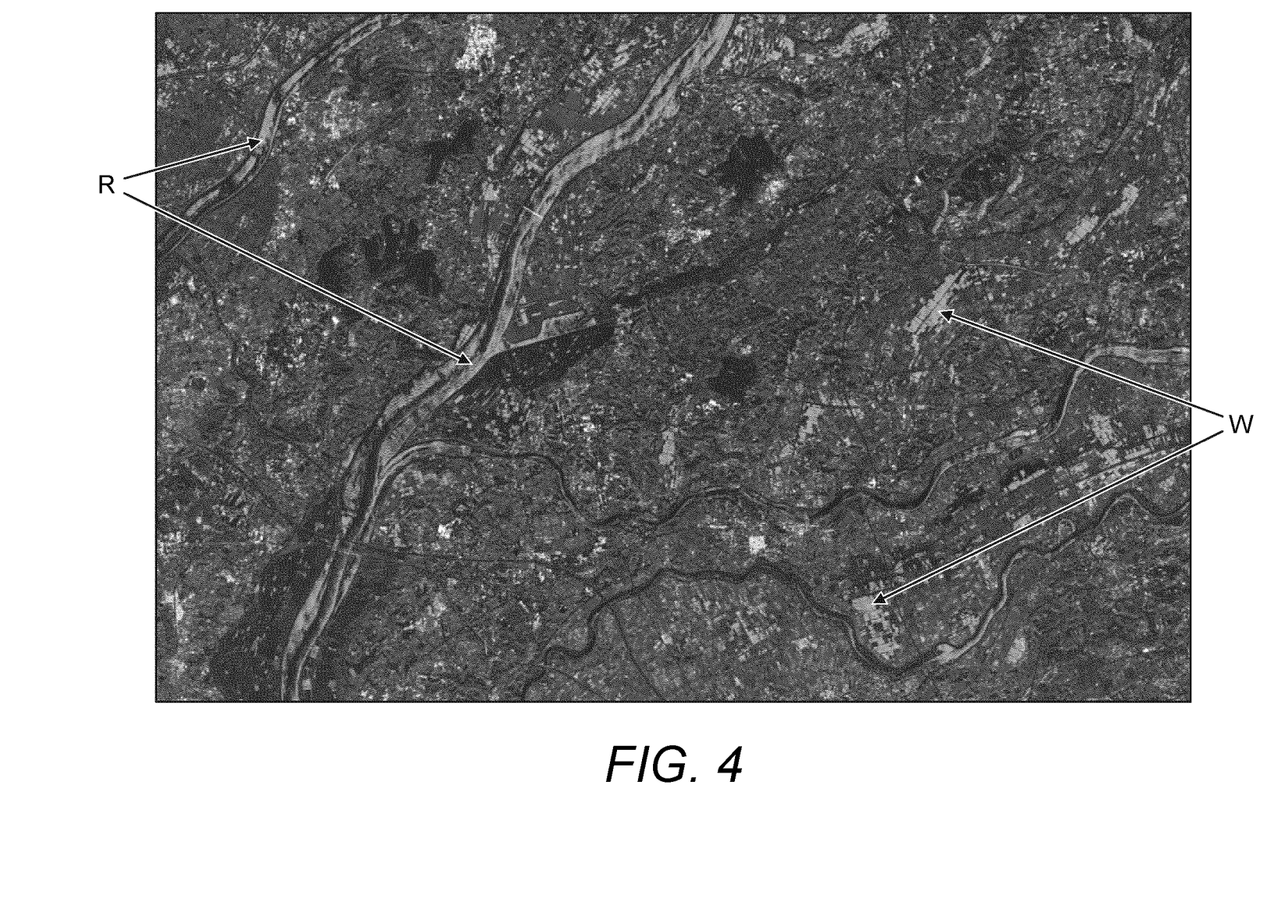
FIG. 4 shows an example of an image obtained by a method according to some embodiments of the invention.

FIG. 4 shows an example of a two channel image generated from two acquisitions where the difference between high and low incidence angles has been colored. Here rivers R can be identified as well as other patches of water W.

Figure 5:
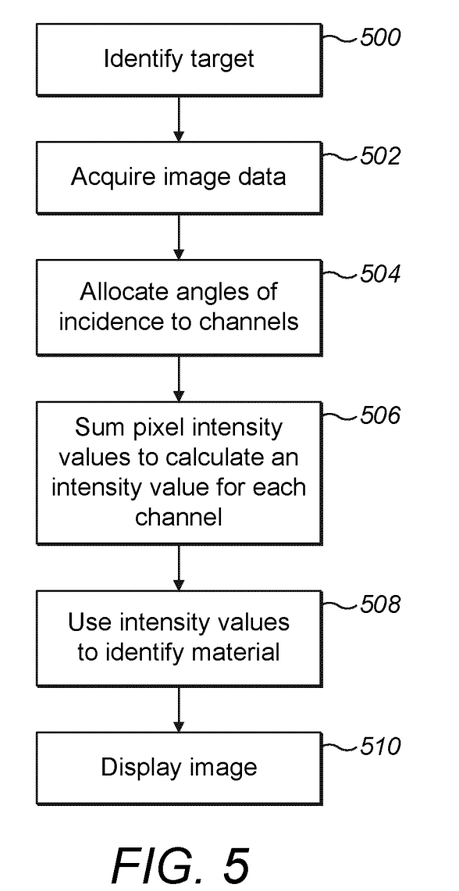
FIG. 5 is a flowchart illustrating a method of earth observation according to some embodiments of the invention.

A method of earth observation according to some embodiments of the invention, of which the method resulting in the image of FIG. 4 is an example, is illustrated in FIG. 5. FIG. 5 uses the example of specific materials but the method may be used for matter in general as noted elsewhere here.

The first step in a method according to some embodiments of the invention may be to identify the target. This may be achieved in a number of ways. In some embodiments, a target area may be notified to a satellite from a ground station, for example following a human observation on the ground or some automatic detection of an area that requires observation. Alternatively one or more algorithms implemented on the satellite may identify a target area. Any other ways of identifying a target area may be used.

At operation 502 the image data is acquired. This acquired data may take the form of a set of image data, one data set for each of different angles of incidence for the same target area. Then as noted above, for each pixel or pixel group represented in the image data, the variation of quantity of backscattered radiation, typically represented by pixel intensity value, may be analysed in order to identify a material imaged in the pixel or pixel group.

In one example the analysis may comprise operations 504-508 of FIG. 5.

Operation 504 comprises allocating at least two subsets of the angles of incidence to respective channels. In the example shown in FIG. 4, two subsets of angles were used, above and below a predetermined threshold. If the data is to be displayed the channel may represent a colour. This allocation may take place before the acquisition of image data, for example based on the known specular reflection properties of materials of interest. Usually a subset would be a sub-range of a total range of angles of incidence but this may not be the case for certain materials.

Operation 506 comprises summing the pixel intensity values from respective sets of image data for each subset of angles. An example set of results will be an intensity value for each channel, e.g. above and below an angle threshold. This may be done on a pixel group rather than pixel by pixel basis.

Operation 508 comprises using the analysis, e.g. the channel intensity values, to identify a material in the pixel or pixel group. In the example of FIG. 4 this was used to differentiate water from other materials on the surface of the earth.

The summed intensity values may be represented on a visual display, for example in the form of an image of the target area, with a colour allocated to each channel, as shown in the two colour example of FIG. 4. It will be appreciated that some materials may give rise to an intensity value in more than one channel so that there is not necessarily a one to one correspondence between materials and channels.

In the three channel example mentioned above, the RGB values may be used to generate a visual representation of the distribution of one or more materials in the target area. It will be appreciated that embodiments of the invention are not limited to the use of RGB as primary colours, or to the use of only three primary colours.

It will be appreciated from the foregoing that methods according to some embodiments of the invention may be devised to identify a particular material. For example, whereas two and three channel processes are described in the foregoing, a "single channel" process is possible in which the different angular positions, or range of angles of incidence are predetermined based on the known properties of a material of interest such as the specular reflection curve of water. Then it may be possible to identify the presence or absence of the material based on the quantity of backscattered radiation in that range of angles of incidence. For example, the pixel intensity values over the range of angles of incidence may be summed and presented visually in grayscale, with darker areas representing a heightened probability of the material being present. The same is possible for more general identification of matter.

The method may include an image being displayed at operation 510.

The foregoing describes some specific embodiments of the invention. Other applications for methods according to the invention include the following:

Embodiments of the invention may be used to classify other things than water, for example agriculture fields in different growth stages will have a specific 'specular curve'.

As mentioned in the foregoing, embodiments of the invention are not limited to what is understood as pure 'staring spotlight' imaging modes. As is known to those skilled in this art, various modes of SAR operation are known and being developed including but not limited to staring spotlight, sliding spotlight and "along-track Scan-SAR" described in more detail in "TerraSAR-X Staring Spotlight Optimisation and Global Performance Predictions", IEEE Journal of Selected Topics in Applied Earth Observations and Remote Sensing, Vol. 9 3 Mar. 2016. For a larger area coverage, for instance 'along-track ScanSAR' type imaging could be used to sacrifice resolution but not the amount of incidence angles (whereas 'sliding spotlight' geometry would limit available angles, even if it would also allow larger area imaging).

Image Acquisition Apparatus

Apparatus suitable for carrying out methods according to some embodiments of the invention will now be described with reference to FIGS. 6 and 7 which are respectively a schematic component diagram and perspective view of a satellite 140 communicating with a target location and/or a ground station 120 on earth. Further details of an example satellite construction may be found in WO2020094872 (A1).

In FIG. 6, one-directional solid arrows between components are used to indicate power connections, two-directional solid arrows are used to indicate RF signal connections, and dotted lines are used to indicate data connections.

Some components are located at the satellite body, indicated by rectangle 120 in FIG. 6, and some are located at a wing, indicated by rectangle 130 in FIG. 6. The satellite components shown in FIG. 6 comprise a power source 101 and a power distribution system 102. The power source 101 and power distribution system 102 supply power to a propulsion system 190, propulsion controller 109, computing system 103 and a communication system 104. The propulsion controller 109 is shown here as a separate item but in practice it may form part of the computing system 103. The propulsion controller may be configured to control the orientation of image acquisition apparatus on the satellite 140 according to some embodiments of the invention, either through the use of control software implemented in one or more processors comprised in the propulsion controller 109 or on in response to received instructions, for example from the computing system. Where the instructions are transmitted from the computing system 103, the computing system may be considered to comprise a propulsion controller.

The power source 101, power distribution system 102, computing system 103 and communication system 104 are collectively referred to in the art as the satellite "bus". The communication system 104 may include one or more antennas, for example located on the satellite body. Alternatively the communication system 104 may send and receive signals via one or more antennas on a wing 130.

In the case of an earth observation satellite, one or more radar antennas 106 or antenna arrays, may be located at one or more wings 160. Each antenna 106 or antenna array may have an associated amplifier 107, supplied with power via a power distribution system 108 from power source 101, for example via power distribution system 102. The antennas 106 together with amplifiers 107 and power distribution system 108 collectively form the image acquisition apparatus referred to elsewhere here, as is known to those skilled in the art. They may perform functions other than the acquisition of image data. Both power distribution systems 102 and 108 may comprise control logic as is known in the art.

The amplifier 107 has a two way data communication link with the computing system 103, in the illustrated example via the power distribution system 108, and may be configured to send data to the computing system 103 such as data relating to received radar signals, optionally via a transceiver, not shown, as would be familiar to those skilled in the art. Such data may include image acquisition data according to some embodiments of the invention. The acquired image data may be processed by the communication system 103, for example to form images and to identify matter on the earth as described elsewhere here, which may then be output to the communication system 104 for onward transmission. Alternatively raw data may be output by the computing system 103 to the communication system 104 for processing by a remote computing system, for example on the ground at the ground station or at another satellite. The computing system 103 may send data to the amplifier 107, for example via the power distribution system 108, such as operating instructions, requests for data and other signals as will be familiar to those skilled in the art.

The communication system 104 may communicate with earth stations such as ground station 200, or other satellites, using radio frequency communication, light, e.g. laser communication, or any other form of communication as is known in the art.

FIG. 7 is a perspective view of a satellite 140, which may comprise the components of FIG. 6, orbiting in space. The satellite of FIG. 7 comprises a body 110, in which some of the body 120 components of FIG. 6 may be housed, or on which some of the components of FIG. 6 may be mounted. Body 110 may additionally house one or more batteries. Body 110 may be partially enclosed, for example to house and protect components. A housing may provide surfaces on which components may be mounted. In the example of FIG. 7 a solar panel 150 is mounted on one rectangular surface of the body 110 and additional solar panels 155 are attached to panel 150 by a struts 115.

The satellite 140 comprises a generally planar structure extending from the body 110 in two opposing directions to provide two "wings" 160. The structure comprising wings 160 is shown to be mounted on or adjacent to a rectangular surface of the body 110. The body 110 and wings 160 are collectively referred to as the spacecraft frame. One or more antennas as described above may be mounted on the satellite "wings". The satellite 140 is provided with a propulsion system 190 for maneuvering the satellite with a generated thrust.

In embodiments of the present invention, the orbit or orbital path of the satellite is not limited and may for example include any Geostationary orbit (GEO), Low Earth orbit (LEO), Medium Earth orbit (MEO), Polar orbit and Sun-synchronous orbit (SSO), Transfer orbits and geostationary transfer orbit (GTO), and Lagrange points (L-points). However, in some embodiments of the present invention, the person skilled in that art would readily understand that testing the satellite in a lab (for example, in a test lab on the ground) may be required before launching into space.

Satellites according to some embodiments of this invention may also comprise systems not described further herein such as but not limited to a heat control system, an attitude control system to ensure that the satellite points in the correct direction.

The term 'computing system' is used herein to refer to any device or group of devices with processing capability such that it/they can execute instructions. Those skilled in the art will realise that such processing capabilities are incorporated into many different devices and therefore the term 'computing system' as used herein may include PCs, servers and many other devices.

The components described herein are not necessarily physically separated from each other unless otherwise stated, and the functionality of components illustrated in the figures may be distributed or shared between different or the same physical devices. For example, some of the functions of a communication system may be performed by a computing system and vice versa.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" may encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence unless otherwise stated. For example, some acts can occur in a different order than what is described herein. In addition, an act can occur concurrently with another act. Further, in some instances, not all acts may be required to implement a method described herein.

It will be understood that the above description of a embodiments is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A method of earth observation comprising:
acquiring multiple synthetic aperture radar "SAR" images of a target area on the earth using a satellite travelling in a low earth orbit above the earth, wherein the data for each image is acquired from a different angle of incidence with respect to the target area and the different angles of incidence are 10° or more, wherein the acquiring comprises controlling an orientation of image acquisition apparatus on the satellite with respect to the target area to remain directed at the target area for a predetermined period as the satellite passes over the target area whereby to acquire the multiple images in a single pass of the satellite over the target area, the controlling the orientation of the image acquisition apparatus with respect to the target is achieved by controlling the orientation of the satellite with respect to the target area, and at least one of the different angles of incidence is generated forward and/or backward along a flight track of the satellite;
for at least one pixel or pixel group in the images, analysing a variation of quantity of backscattered radiation with respect to angle of incidence; and
using the analysis to identify matter imaged in the pixel or pixel group.

2. The method of claim 1, wherein the different angles of incidence are determined based on a specular reflection curve for particular matter.

3. The method of claim 2, wherein the particular matter is water.

4. The method of claim 1, comprising acquiring image data during discrete intervals within the predetermined period.

5. The method of claim 4, comprising controlling the orientation of the image acquisition apparatus to enable the acquisition of image data from a continuous range of different angular positions with respect to the target during the discrete intervals within the predetermined period.

6. The method of claim 1, wherein the analysing comprises allocating at least two subsets of the angles of incidence to respective channels and summing pixel intensity values to calculate an intensity value for each channel.

7. The method of claim 6, comprising representing the summed intensity values on a visual display.

8. The method of claim 6, comprising allocating a subset of the different angles of incidence to each of primary colours for a visual display and using the summed intensity values to generate a colour representation of the target area.

9. The method of claim 1, wherein at least some of the incidence angles are generated backward along the flight track of the satellite.

10. A non-transitory computer readable data storage comprising instructions which when implemented on one or more processors on a satellite cause the implementation of a method of earth observation, the method comprising:
acquiring multiple synthetic aperture radar "SAR" images of a target area on the earth using a satellite travelling in a low earth orbit above the earth, wherein the data for each image is acquired from a different angle of incidence with respect to the target area and the different angles of incidence are 10° or more, wherein the acquiring comprises controlling an orientation of image acquisition apparatus on the satellite with respect to the target area to remain directed at the target area for a predetermined period as the satellite passes over the target area whereby to acquire the multiple images in a single pass of the satellite over the target area, the controlling the orientation of the image acquisition apparatus with respect to the target is achieved by controlling the orientation of the satellite with respect to the target area, and at least one of the different angles of incidence is generated forward and/or backward along a flight track of the satellite;
for at least one pixel or pixel group in the images, analysing a variation of quantity of backscattered radiation with respect to angle of incidence; and
using the analysis to identify matter imaged in the pixel or pixel group.

* * * * *